United States Patent [19]

Hoffend

[11] Patent Number: 5,782,447
[45] Date of Patent: Jul. 21, 1998

[54] POOL HOOK

[76] Inventor: Thomas J. Hoffend, 1472 Long Pond Rd., Rochester, N.Y. 14626

[21] Appl. No.: 667,938

[22] Filed: Jun. 24, 1996

[51] Int. Cl.[6] .................... A47B 96/06; A47K 1/00
[52] U.S. Cl. ............... 248/227.1; 248/215; 248/225.11; 248/227.2; 248/294.1; 248/305; 248/900
[58] Field of Search ............. 248/226.11, 227.1, 248/227.2, 215, 305, 225.11, 290.1, 294.1, 304, 900, 548, 322; 244/143, 151 A, 151 B; 403/389, 397, 384

[56] References Cited

U.S. PATENT DOCUMENTS

| | | | |
|---|---|---|---|
| 140,234 | 6/1873 | Ames et al. | 248/227.2 |
| 583,673 | 6/1897 | Deplanty et al. | 248/227.1 |
| 807,257 | 12/1905 | Fennel . | |
| 1,640,497 | 8/1927 | Halket et al. . | |
| 2,042,241 | 5/1936 | Turnock | 204/5 |
| 2,772,450 | 12/1956 | Stewart | 20/531 |
| 2,925,916 | 2/1960 | Pollock | 21/86 |
| 3,907,118 | 9/1975 | Pelavin | 211/113 |
| 4,258,893 | 3/1981 | Tolley | 248/441 B |
| 4,387,873 | 6/1983 | Pavlo et al. | 248/227.1 |
| 4,628,893 | 12/1986 | Shaw, III | 248/227.1 X |
| 4,903,926 | 2/1990 | McNarry et al. | 248/214 |
| 4,973,021 | 11/1990 | Schulte | 248/495 |
| 5,400,990 | 3/1995 | Frankel | 248/215 |
| 5,553,823 | 9/1996 | Protz, Jr. | 248/215 X |

FOREIGN PATENT DOCUMENTS 445993 11/1912 France ............... 248/294.1

*Primary Examiner*—William Stryjewski
*Attorney, Agent, or Firm*—Cumpston & Shaw

[57] ABSTRACT

A detachable support attachable to a swimming pool having a clamp, and a hook assembly attached to the clamp, wherein the hook assembly disengages from the clamp when the load force exerted on the hook exceeds a predetermined level.

20 Claims, 3 Drawing Sheets

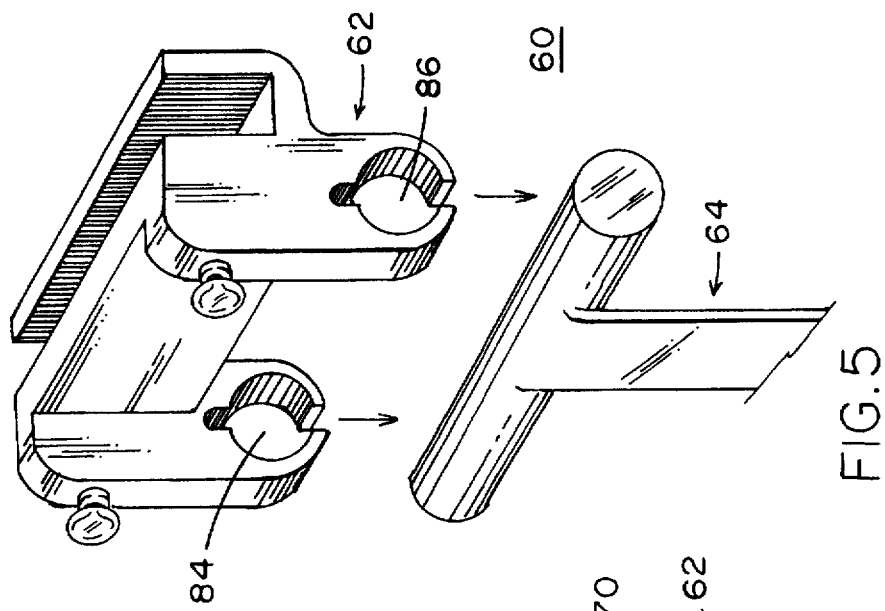
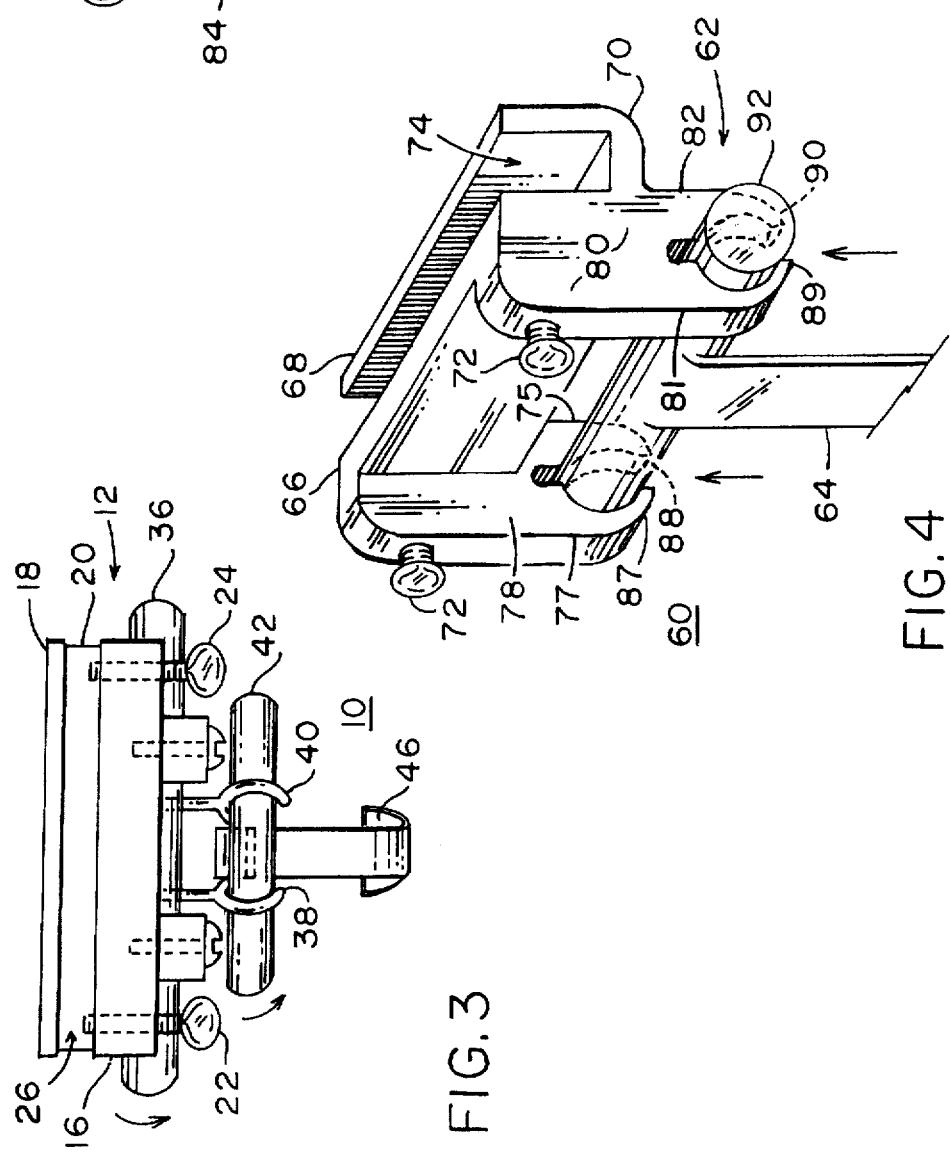

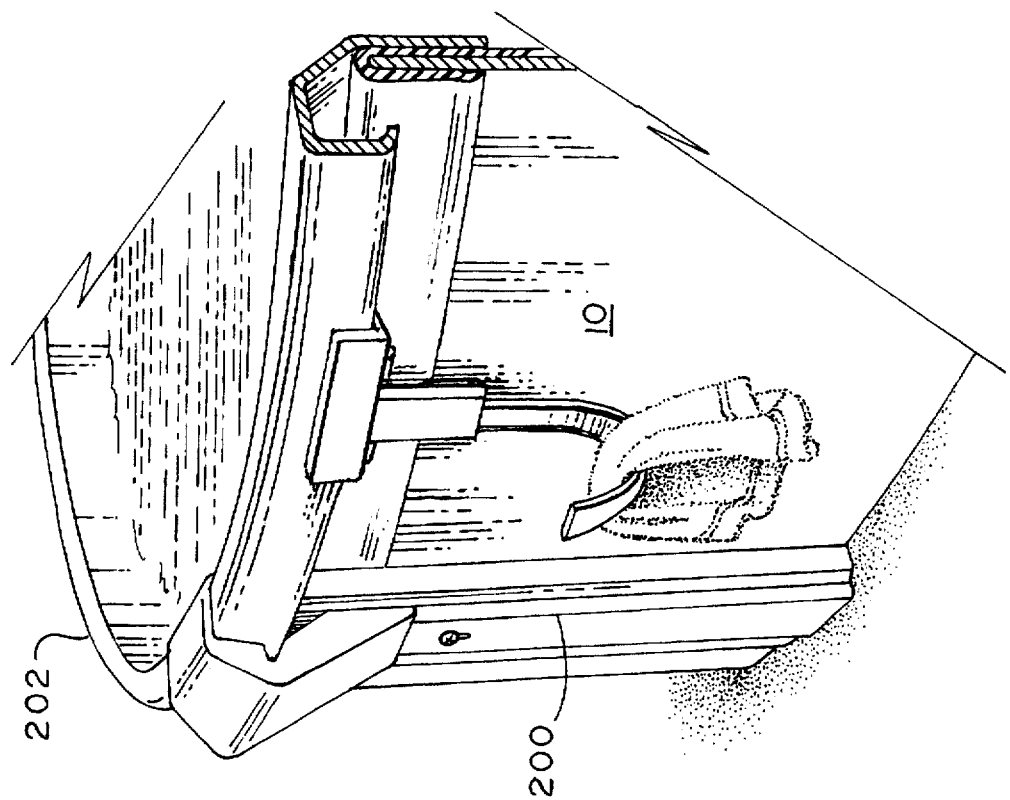
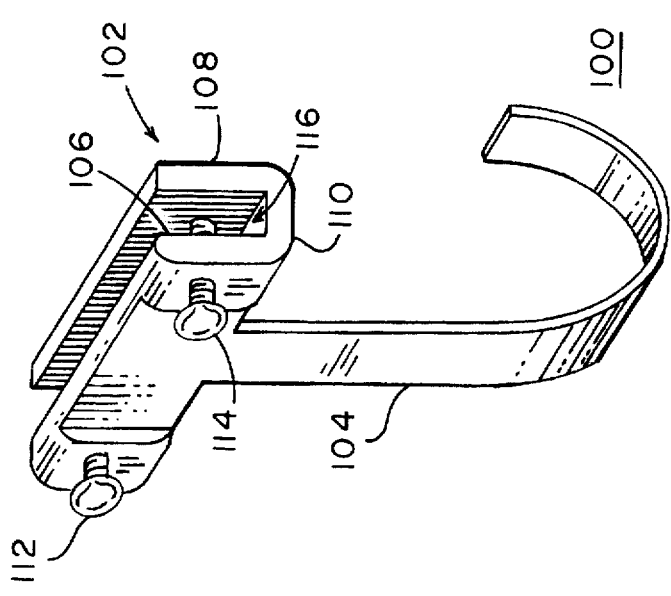
FIG. 6
FIG. 7

POOL HOOK

FIELD OF THE INVENTION

The present invention relates to the field of support systems, more particularly to securable hooks, especially hooks which are detachably secured to swimming pools.

BACKGROUND OF THE INVENTION

Pools, especially above-ground swimming pools have become increasingly popular and affordable. More people are enjoying the refreshing effects and leisure afforded by having backyard pools. Pool maintenance is often being done by the homeowner resulting in the necessary storage of much equipment such as nets, pool vacuum parts such as hoses, etc. While such equipment is often stored in nearby cabanas, it would be highly advantageous to accommodate the needed maintenance equipment, as well as the peripheral poolside paraphernalia in a manner which would place the needed items more closely at hand.

Permanently affixing or securing hooks to pool structures, which are most often made from fiberglass, could weaken or damage the area of the pool to which such hooks are attached. It may be otherwise undesirable to permanently attach hooks, since equipment hanging needs may change, or be obviated altogether (e.g. during the off-season). Further, if the hooks are placed on the exterior of the pool, such hook-like projections extending outwardly from the pool could present an unwelcome hazard to passersby who may get inadvertently poked or otherwise injured.

SUMMARY OF THE INVENTION

The present invention provides a multipiece support attachable to a swimming pool. The support comprises a clamp for attaching the support to a swimming pool with a hook joined in a disengageable relation to the clamp. The hook disengages from the clamp when the weight of articles to be supported on the support exceeds a predetermined weight, or when an excessive force is presented to the hook.

The present invention further provides a detachable multipiece support attachable to a swimming pool. The support comprises a clamp having a longitudinal groove defined by first and second legs attached to a base. The legs have inner and outer surfaces with at least one threaded opening present through at least one of the legs and into the inner surface such that a threaded fastener extends through the leg and into the groove. A longitudinal support is attached to the clamp. The longitudinal support has at least one tension clip extending therefrom, with the clip having first and second spaced apart arms to receive a support hook. The support hook comprises a mounting head which is attached to the hook and which engages the tension clip. The support hook is disengageable from the clamp.

Still further, the present invention provides a detachable support for suspending articles from a flange downwardly extending from the rim of an above-ground swimming pool. The support comprises a clamp body having a longitudinal groove for receiving the pool rim flange. The groove is defined by first and second legs having outer and inner surfaces attached to a base, at least one of the legs has at least one threaded opening extending through the leg. A threaded fastener extends through the threaded opening and into the groove to securely attach the support to the pool rim flange. A hook assembly securely joins the clamp in movable relation to the clamp.

The present invention also provides a method of suspending articles from a swimming pool comprising securing a clamp to a swimming pool and releasably attaching a hook assembly to said clamp at a tension joint in a secure and disengageable relation. The tension joint is adapted to securely engage the hook assembly with the clamp at and below a predetermined force, and will disengage from the clamp above a predetermined force level. Articles are then suspended from the hook assembly.

BRIEF DESCRIPTION OF THE DRAWINGS

FIG. 3 is an overhead view of the pool hook of FIG. 1.

FIGS. 4 and 5 are perspective views of an alternative embodiment pool hook.

FIG. 6 is a frontal view of the non-disengageable version pool hook.

FIG. 7 is a view of a swimming pool showing the pool hook of FIG. 1 in place.

DETAILED DESCRIPTION OF THE DRAWINGS

Figures 1, 2:
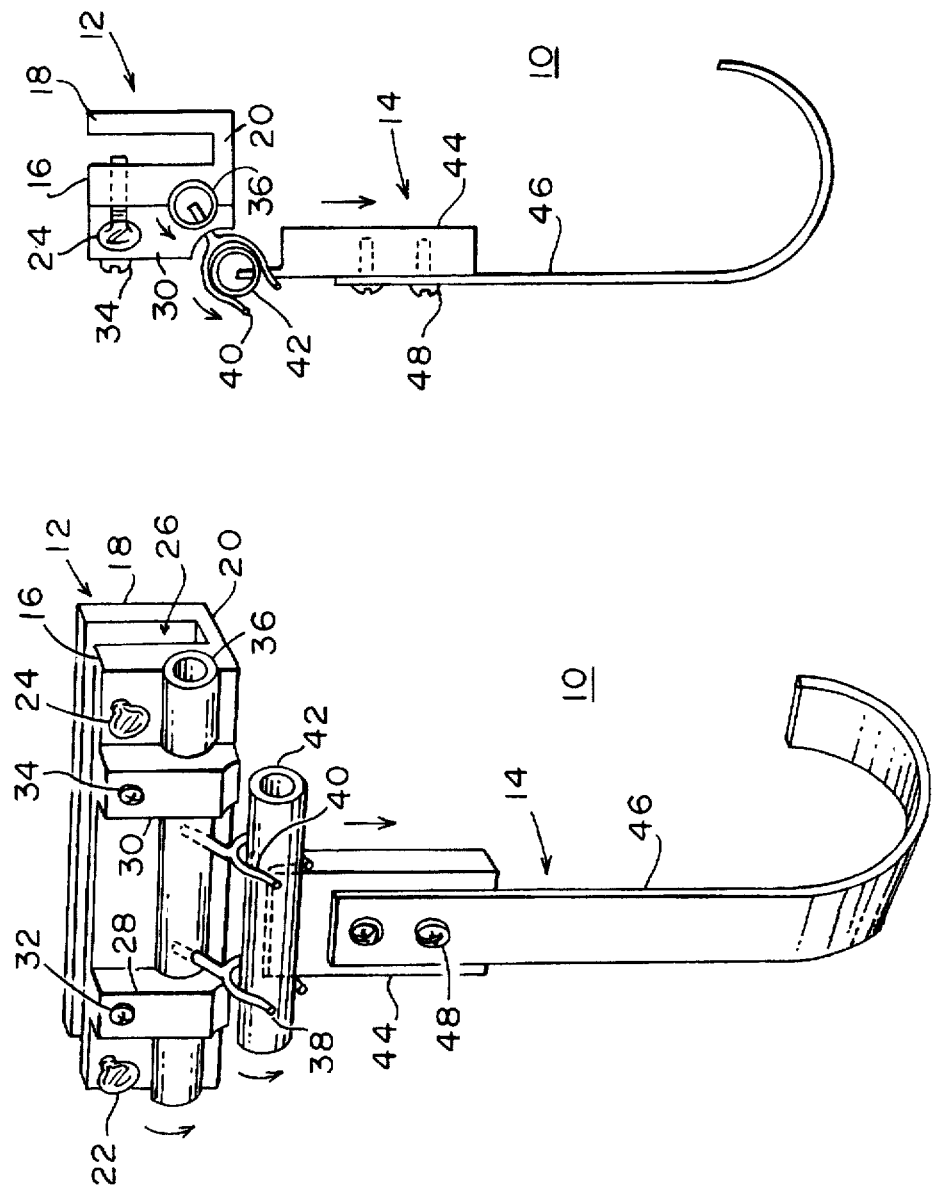
FIG. 1 is a perspective view of the multipiece disengageable pool hook.
FIG. 2 is a side view of the pool hook of FIG. 1.

As shown in FIGS. 1-3, pool hook 10 comprises clamp portion 12, and hook portion 14. A clamp 12 having first and second legs 16, 18 respectively and base 20, has threaded turnscrew fasteners 22, 24 positioned axially into threaded openings (not visible) made through first leg 16. Longitudinal groove 26 extends through the length of clamp 12, and will receive a lip or rim of a swimming pool to which it is attached when in use. Braces 28, 30 are fastened to clamp 12 via screws 32, 34. The braces 28, 30 secure longitudinal support 36 which had tension clips 38, 40 extending therefrom. As indicated by the curved arrows, the longitudinal support 36 is pivotal within the braces 28, 30. Tension clips 38, 40 engage mounting head 42 of hook assembly 14. As indicated by the curved arrows, the mounting head 42 is pivotal within the tension clips 38, 40. Mounting head 42 is attached to hook mount 44, which is in turn attached to hook 46 via screw 48.

FIGS. 4 and 5 are perspective views of an alternative embodiment of the present invention. Pool hook 60 comprises a clamp assembly 62 and a one-piece hook 64. Clamp 62 having first and second legs 66, 68 respectively and base 70, has threaded turnscrew fasteners 72 positioned axially into threaded opening (not shown) made through first leg 66. Longitudinal groove 74 extends through the length of clamp 62 and will receive a lip or rim of a swimming pool to which it is attached when in use. Braces 78, 80 are integrally molded to clamp 62 and comprise legs 81, 82 which include securing tips 88, 90 respectively and define cylindrical grooves 84, 86. Braces 78, 80 engage the cylindrical mounting bar 92 of hook 64, said mounting bar and hook being integrally molded as one piece.

Preferably the width of the mounting bar 92 has a diameter that is about equal to or slightly larger than the diameter of the cylindrical grooves 84, 86. Further, diameter of mounting bar 92 to be engaged by braces 78, 80 has a diameter that is greater than the open distance between the securing tips of the brace legs. In this way, as shown in FIG. 5, the mounting bar of the one-piece hook may be snapped into place securely into the cylindrical grooves in the braces, and held in place with adequate inward lateral tension exerted on the mounting bar by the brace legs and leg tips. The brace legs are designed to release the hook from the clamp portion of the device when the weight of the load presented to the hook exceeds a predetermined amount at which point the hook will predictably break away from the clamp body.

In operation, the pool hook is attached to a rim or lip of an above-ground swimming pool to facilitate suspending pool equipment and accessories. The turn fasteners are opened (turned counter clockwise) until no part of the fastener remains in the groove. The groove, which is preferably U-shaped, then receives the pool rim, and the fasteners are screwed to secure the clamp to the pool rim. The hook assembly, engages and preferably hangs vertically from the tension hooks. Equipment, or other accessories including clothing, towels, toys, goggles, swimcaps, nets, flotation devices, pool vacuum equipment, etc. may be suspended from the hooks. If the weight of the item(s) to be suspended exceeds the safe limit above which damage to the pool rim may be sustained, the hook will safely break away from the clamp portion. In this way, inadvertent damage to the pool and pool rim is avoided. As the hook assembly is engageable with the tension clips 38, 40 of FIGS. 1–3 and the clamp 62 of FIGS. 4–5, it is evident that the hook assembly is reattachable with the clamp portions after disengagement of the hook from the clamp portion. For example, as indicated by the upward arrows of FIG. 4, the hook 64 is reattachable to the clamp assembly 62.

FIG. 6 shows a further alternative embodiment of the present invention wherein the adjustable pool hook 100 comprises a clamp feature 102 incorporated in one molded piece with hook feature 104. Clamp 102 20 has first and second legs 106, 108 respectively and base 110 with threaded turnscrews 112, 114 threaded through openings (not shown) made through the first leg 106. A longitudinal groove 116 extends through the length of clamp 102.

FIG. 7 shows pool hook 10 of FIG. 1 attached to rim 202 of an above-ground swimming pool 200. Pool equipment is shown suspended from pool hook in a neat and orderly fashion.

The pool hooks of the present invention may also provide additional measures of safety at the poolside environment. Should a child's clothing, or swinging towel accidentally become entangled in the pool hook, the hook portion of the unit will break away from the clamp feature of the device before any damage can be sustained by the pool or the individual attached to the entangled objects.

The material selected for construction of the pool hook pieces and fittings of the present invention is not critical. The marine environment in which the hook is to be employed will affect the preferred material choice. Therefore, the material chosen should be corrosion resistant, and resist the destructive effects of chlorine, salt, algaecide, pool support chemicals, moisture, and ultraviolet radiation. Preferred materials are plastics such as polyethylene, polystyrene, and polypropylene, nylon, stainless steel, coated stainless steel, rubber, brass, etc., and combinations thereof. In a preferred embodiment, the material chosen allows engagement, disengagement, and reattachment of the hook assembly with and from the clamp portion.

It is understood that, in the preferred embodiment, the groove in the clamp which engages the pool rim is rectangular with planar edges occurring at 90° angles to achieve a preferred U-shape. The groove may be of any desired configuration and may include complex surfaces such as barbs, teeth, points, bumps, etc., which could assist in gripping the pool rim. The pool hook is preferably allowed to pivot in the hold of the clamp. The pivoting of the hook may be accomplished, for example, by the longitudinal support 36 pivotal within the braces 28, 30 and by the mounting head 42 pivotal within the tension clips 38, 40 as indicated by the curved arrows in FIGS. 1–3. This facilitates the hook hanging vertically regardless of the clamp angle required by the angle of the pool rim to which the clamp attaches.

It is further understood that clamp grooves may be custom-designed to be used exclusively with certain pool types and styles, offering potential marketing advantages to pool manufacturers. In addition, the fasteners which are turned to tighten the clamp into a secure position relative to the pool rim may be made from any suitable material, and be positioned on the outside of the clamp or on the underside of the clamp, away from view. Also contemplated are fasteners having additional plates or bumpers attached to their terminal ends to assist in securely grabbing and holding the rim of a pool or pool cover.

It is further understood that components shown in the preferred embodiment may be combined or obviated altogether if desired so long as the proper function of the pool hook remains. For example, the longitudinal support may be secured to the clamp by braces as shown in the drawings. It may also be integrally molded into the clamp, or may be obviated as shown in FIG. 4.

While the break-away feature of the multipiece pool hook support of the present invention is viewed as being the most preferred embodiment, it is understood that alternate embodiments contemplate a one piece hook or two piece hook assembly which does not disengage regardless of the load placed upon the hook. In this embodiment, the clamp is preferably one unitary piece which then secures the hook assembly which is also preferably one unitary piece. Some movement between the clamp and the hook is contemplated if desirable.

Many other modifications and variations of the present invention are possible to the skilled practitioner in the field in light of the teachings herein. It is therefore understood that, within the scope of the claims, the present invention can be practiced other than as herein specifically described.

What is claimed is:

1. A detachable multipiece support attachable to a swimming pool, said support comprising:
   a clamp having a longitudinal groove, said groove defined by first and second legs attached to a base, said legs having outer surfaces and inner surfaces;
   a longitudinal support parallel to the longitudinal groove and attached to said clamp, said longitudinal support having at least one tension clip extending therefrom, said clip having first and second spaced apart arms;
   a support hook; and
   a mounting head attached to the hook and engaged between the first and second spaced apart arms of the tension clip,
   wherein said support hook is releasable from said clamp.

2. The support according to claim 1, wherein the tension clip is adapted to release the mounting head upon the application of a predetermined force to the hook.

3. The support according to claim 1, wherein the longitudinal support is integrally molded into the clamp.

4. The support according to claim 1, wherein the longitudinal support is pivotally attached to the clamp by braces.

5. The support according to claim 1, wherein the hook and mounting head comprise one integral piece.

6. The support according to claim 1, wherein the hook pivots relative to the clamp.

7. The support according to claim 1 wherein the at least one tension clip is integrally molded with the clamp.

8. The support according to claim 7 wherein the first and second spaced apart arms of the at least one tension clip are integrally joined.

9. The support according to claim 1 wherein the mounting head is cylindrical.

10. The support according to claim 9 wherein the first and second spaced apart arms of the at least one tension clip are integrally joined.

11. The support according to claim 10 wherein the first and second spaced apart arms of each clip are located at diametrically opposite positions of the mounting head.

12. The support according to claim 1 wherein said first leg comprises at least one threaded opening to said inner surface, the support further comprising a threaded fastener extending through said first leg and into said groove.

13. The support according to claim 1 the support hook is reattachable to the clamp following a release from the clamp.

14. In combination, an above ground swimming pool and multipiece support.

the above ground swimming pool comprising a downwardly depending rim: and, the multipiece support comprising:

a clamp having two upwardly projecting legs spaced apart a sufficient distance to position the rim of the pool securely and releasably therebetween:

at least one tension clip attached to the clamp having first and second joined spaced apart arms: and, a hook having a mounting head joined in a disengageable relation between the joined spaced apart arms of the tension clip.

15. A detachable support for suspending articles from a flange downwardly extending from the rim of an above ground swimming pool comprising:

a clamp body having a longitudinal groove for securely and removably receiving the flange, the clamp body defined by first and second legs having outer and inner surfaces, said legs attached to a base;

a tension clip attached to the clamp body; and, a hook assembly securely joined in pivotal relation to said clamp body, the hook assembly having a mounting head, the tension clip surrounding the mounting head to releasably hold the hook assembly, the mounting head adapted to release downwardly from the clamp body when a force above a predetermined force is applied to the hook assembly.

16. The support according to claim 15 wherein the tension clip has first and second spaced apart arms which are integrally joined.

17. The support according to claim 16 wherein the mounting head is cylindrical wherein the clamp body has a longitudinal support pivotally attached by braces, the longitudinal support having the tension clip extending therefrom.

18. The support according to claim 17 wherein the first arm and second arm are located at diametrically opposite positions of the mounting head.

19. The support according to claim 17 wherein the clamp body has a longitudinal support pivotally attached by braces, the longitudinal support having the tension clip extending therefrom.

20. The support according to claim 15 wherein the hook assembly is reattachable to the clamp body following a release from the clamp body.

* * * * *